United States Patent
Wang et al.

(10) Patent No.: US 12,490,325 B2
(45) Date of Patent: Dec. 2, 2025

(54) TRANSMISSION METHOD AND DEVICE IN A WIRELESS COMMUNICATION SYSTEM

(71) Applicant: Samsung Electronics Co., Ltd., Suwon-si (KR)

(72) Inventors: Yi Wang, Beijing (CN); Feifei Sun, Beijing (CN); Jingxing Fu, Beijing (CN)

(73) Assignee: Samsung Electronics Co., Ltd., Suwon-si (KR)

( * ) Notice: Subject to any disclaimer, the term of this patent is extended or adjusted under 35 U.S.C. 154(b) by 502 days.

(21) Appl. No.: 17/921,228

(22) PCT Filed: Apr. 29, 2021

(86) PCT No.: PCT/KR2021/005490
§ 371 (c)(1),
(2) Date: Oct. 25, 2022

(87) PCT Pub. No.: WO2021/221487
PCT Pub. Date: Nov. 4, 2021

(65) Prior Publication Data
US 2023/0171828 A1 Jun. 1, 2023

(30) Foreign Application Priority Data
Apr. 30, 2020 (CN) .......................... 202010363570.2

(51) Int. Cl.
*H04B 7/0408* (2017.01)
*H04B 7/06* (2006.01)
(Continued)

(52) U.S. Cl.
CPC ........ *H04W 76/15* (2018.02); *H04B 7/06952* (2023.05); *H04W 52/367* (2013.01); *H04W 72/20* (2023.01)

(58) Field of Classification Search
CPC ..... H04W 76/15; H04W 76/25; H04W 88/06; H04W 52/367; H04W 52/34;
(Continued)

(56) References Cited

U.S. PATENT DOCUMENTS 9,629,094 B2 * 4/2017 Damnjanovic ....... H04W 52/48
9,867,146 B2 * 1/2018 Yin ..................... H04W 52/346
(Continued)

FOREIGN PATENT DOCUMENTS

| KR | 10-2019-0055221 A | 5/2019 |
| KR | 10-2020-0010025 A | 1/2020 |
| KR | 10-2020-0043403 A | 4/2020 |

OTHER PUBLICATIONS

3GPP TS 23.501, "3rd Generation Partnership Project; Technical Specification Group Services and System Aspects; System Architecture for the 5G System (5GS); Stage 2" v16.2.0 Sep. 2019) (Year: 2019).*

(Continued)

*Primary Examiner* — Christopher M Crutchfield
*Assistant Examiner* — Syed Ahmed
(74) *Attorney, Agent, or Firm* — Jefferson IP Law, LLP

(57) ABSTRACT

The present disclosure relates to a communication method and system for converging a 5th-generation (5G) communication system for supporting higher data rates beyond a 4th-generation (4G) system with a technology for internet of things (IoT). The present disclosure may be applied to intelligent services based on the 5G communication technology and the IoT-related technology, such as smart home, smart building, smart city, smart car, connected car, health care, digital education, smart retail, security and safety services. The present disclosure discloses a transmission method and device. According to an aspect of the present disclosure, a method performed by a user equipment (UE) in (Continued)

a communication system is provided. The method includes: receiving, by the UE, configuration information from a base station, and determining a first number of connections scheduled by the base station based on the configuration information; determining a second number of connections that UE can establish simultaneously based on a first rule; selecting a second number of connections from the first number of connections based on a second rule.

14 Claims, 7 Drawing Sheets

(51) Int. Cl.
*H04W 52/34* (2009.01)
*H04W 52/36* (2009.01)
*H04W 72/20* (2023.01)
*H04W 76/15* (2018.01)
*H04W 76/25* (2018.01)
*H04W 24/02* (2009.01)
*H04W 72/1268* (2023.01)
*H04W 88/06* (2009.01)

(58) Field of Classification Search
CPC . H04W 52/281; H04W 52/146; H04W 72/20; H04W 72/569; H04W 72/168; H04W 24/02; H04L 5/001; H04L 5/0023; H04L 5/0064; H04L 5/0091; H04B 7/0695; H04B 7/408
USPC .......................................................... 370/329
See application file for complete search history.

(56) References Cited

U.S. PATENT DOCUMENTS

| | | | |
|---|---|---|---|
| 10,194,357 B2* | 1/2019 | Lee | H04W 76/27 |
| 10,536,986 B2* | 1/2020 | Kim | H04W 76/19 |
| 10,687,378 B2* | 6/2020 | Kim | H04W 76/15 |
| | | | 370/328 |
| 11,013,054 B2* | 5/2021 | Yi | H04W 68/02 |
| 11,071,086 B2* | 7/2021 | Park | H04W 68/005 |
| 11,901,999 B2* | 2/2024 | Zhang | H04L 5/0051 |
| 2017/0208542 A1 | 7/2017 | Kim et al. | |
| 2018/0098250 A1 | 4/2018 | Vrzic et al. | |
| 2019/0200406 A1* | 6/2019 | Henttonen | H04W 76/15 |
| 2020/0028740 A1 | 1/2020 | Kim et al. | |
| 2020/0100128 A1 | 3/2020 | Fan et al. | |
| 2021/0076273 A1* | 3/2021 | Zhou | H04W 24/08 |

OTHER PUBLICATIONS

Joern Krause, 'Overview of Rel-17 Work Areas for NR and LTE', RP-191486, 3GPP RAN#84, Jun. 4, 2019, Newport Beach.

* cited by examiner

TRANSMISSION METHOD AND DEVICE IN A WIRELESS COMMUNICATION SYSTEM

TECHNICAL FIELD

The present disclosure relates to a wireless communication technical field, and more specifically, to a transmission method and device when there are multiple connection paths for a user equipment (UE).

BACKGROUND ART

In order to meet the increasing demand for wireless data communication services since the deployment of 4G communication systems, efforts have been made to develop improved 5G or pre-5G communication systems. Therefore, 5G or pre-5G communication systems are also called "Beyond 4G networks" or "Post-LTE systems".

In order to achieve a higher data rate, 5G communication systems are implemented in higher frequency (millimeter, mmWave) bands, e.g., 60 GHz bands. In order to reduce propagation loss of radio waves and increase a transmission distance, technologies such as beamforming, massive multiple-input multiple-output (MIMO), full-dimensional MIMO (FD-MIMO), array antenna, analog beamforming and large-scale antenna are discussed in 5G communication systems.

In addition, in 5G communication systems, developments of system network improvement are underway based on advanced small cell, cloud radio access network (RAN), ultra-dense network, device-to-device (D2D) communication, wireless backhaul, mobile network, cooperative communication, coordinated multi-points (CoMP), reception-end interference cancellation, etc.

In 5G systems, hybrid FSK and QAM modulation (FQAM) and sliding window superposition coding (SWSC) as advanced coding modulation (ACM), and filter bank multicarrier (FBMC), non-orthogonal multiple access (NOMA) and sparse code multiple access (SCMA) as advanced access technologies have been developed.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In line with this, various attempts have been made to apply 5G communication systems to IoT networks. For example, technologies such as a sensor network, Machine Type Communication (MTC), and Machine-to-Machine (M2M) communication may be implemented by beamforming, MIMO, and array antennas. Application of a cloud Radio Access Network (RAN) as the above-described Big Data processing technology may also be considered to be as an example of convergence between the 5G technology and the IoT technology.

DISCLOSURE OF INVENTION

Technical Problem

In the existing communication systems, a UE may establish connections with multiple carriers of a base station through carrier aggregation (CA). In carrier aggregation, the UE may maintain connections with 16 or 32 carriers at most. A UE may also establish connections with two base stations by way of dual-connectivity. With the emergence of new types of networks, such as the emergence of non-public networks (NPNs), a UE may need to be connected in different networks simultaneously, for example, to be connected in the NPN and the public land mobile network (PLMN) simultaneously. Networks based on various access technologies will coexist within a period of time, such as LTE, NR and 6G networks, and a UE may need to be connected in different networks simultaneously. Moreover, with the expansion of available carrier frequency domain, for example, with the emergence of frequency points below 1 GHz, frequency points above 1 GHz and below 6 GHz, as well as millimeter wave bands, and even terahertz bands in the future, a UE may need to be connected in different frequency points simultaneously, in order to meet requirements of coverage and high speed. In addition, as the cooperation among various operators deepens, a UE may be served by multiple operators simultaneously.

Solution to Problem

In one embodiment, a method performed by a user equipment (UE) in a communication system, the method comprising: receiving configuration information from a base station; determining a first number of connections scheduled based on the configuration information; determining a second number of connections that the UE can establish simultaneously based on a first rule; and selecting a second number of connections from the first number of connections based on a second rule.

In another embodiment, a user equipment (UE) in a communication system, the UE comprising: a transceiver; and a controller configured to: receive, from a base station via the transceiver, configuration information, determine a first number of connections scheduled based on the configuration information, determine a second number of connection that the UE can establish simultaneously based on a first rule, and select a second number of connections from the first number of connections based on a second rule.

Advantageous Effects of Invention

Based on these requirements, a UE may need to establish connections with more than two networks simultaneously. One or more embodiments of the present disclosure propose a multi-connection-based working mode to improve the existing transmission method to improve the overall system efficiency.

BRIEF DESCRIPTION OF DRAWINGS

Through the following description taken in conjunction with the drawings, the above and additional aspects and advantages of the present disclosure will become more apparent and readily comprehensible, in which.

MODE FOR THE INVENTION

Figure 1:
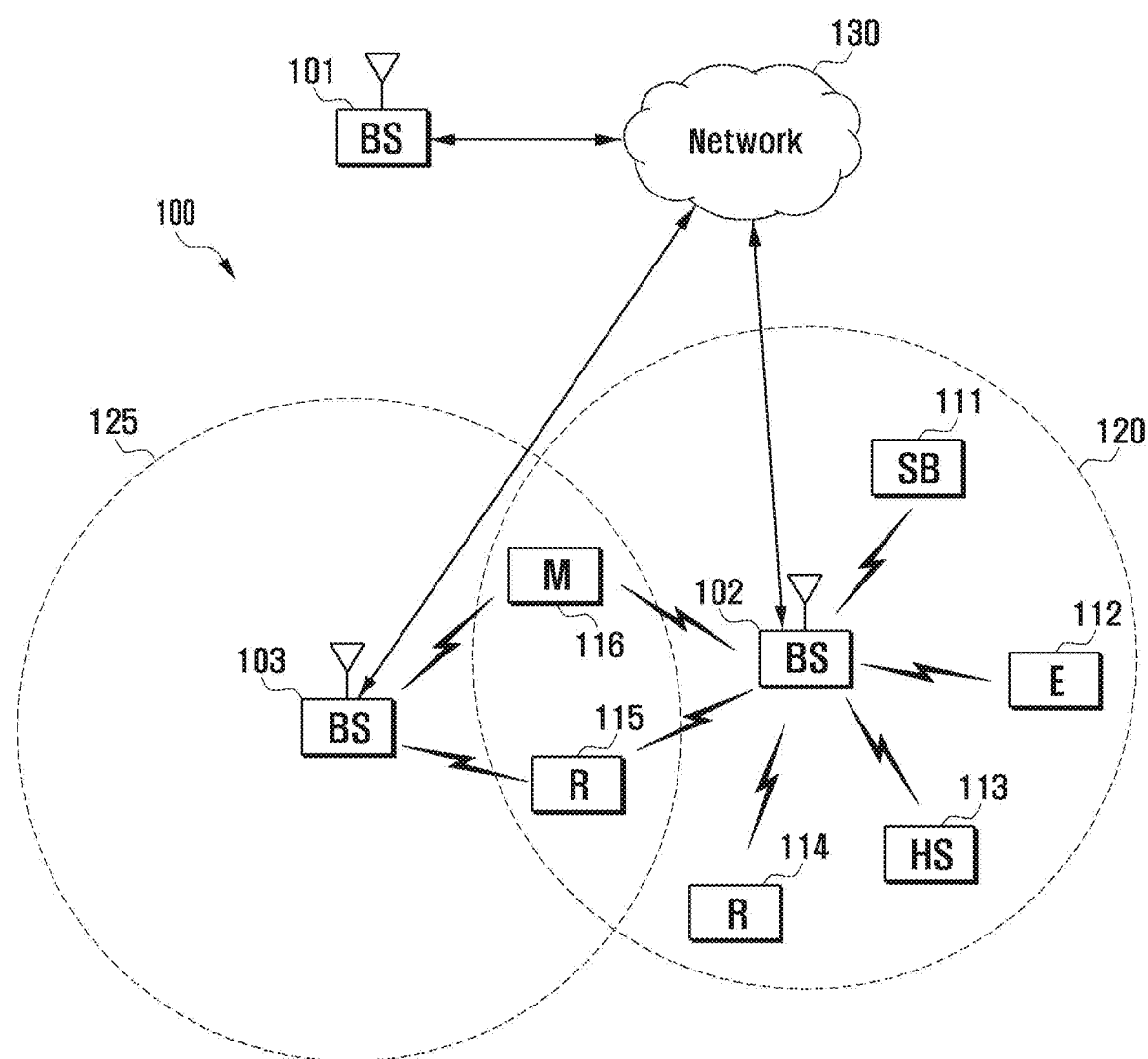
FIG. 1 illustrates an example wireless network according to various embodiments of the present disclosure.

According to an aspect of the present disclosure, there is provided a method performed by a user equipment (UE) in a communication system. The method includes: receiving, by the UE, configuration information from a base station, and determining a first number of connections scheduled by the base station based on the configuration information; determining a second number of connections that the UE may establish simultaneously based on a first rule; selecting a second number of connections from the first number of connections based on a second rule.

Optionally, the connections are all uplink connections; or where, the connections are all downlink connections. Optionally, the second number of connections used simultaneously by the UE for reception is different from the second number of connections used simultaneously by the UE for transmission; or the second number of connections used simultaneously by the UE for reception is as same as the second number of connections used simultaneously by the UE for transmission.

Optionally, the first rule includes at least one of: the second number not exceeding a number of radio frequency channels possessed by the UE; the second number not exceeding a number of baseband processing branches that may be used for parallel processing possessed by the UE; the second number not exceeding a number of beams that may be simultaneously used for transmission possessed by the UE; the second number not exceeding a number of beams that may be simultaneously used for reception possessed by the UE; a sum of transmit power expected for the second number of connections not exceeding a predefined maximum transmit power; a number of directions of transmission beams expected for the second number of directions not exceeding a third number; a number of directions of reception beams expected for the second number of directions not exceeding the third number.

Optionally, selecting the second number of connections from the first number of connections based on the second rule includes: determining a priority of a respective connection based on the second rule; selecting the second number of connections in a descending order of priority, where the second rule includes at least one of: a channel type; a carrier/cell type; a transmission procedure; a service type; a carrier/cell frequency point.

Optionally, in case of determining the priority of the respective connection according to the channel type, a priority of a type of an uplink channel is determined according to at least one of the following methods: a first priority: physical random access channel (PRACH) transmission on a primary cell (PCell); a second priority: physical uplink control channel (PUCCH) transmission with hybrid automatic repeat request acknowledgement (HARQ-ACK) information and/or resource request (SR), or physical uplink sharing channel (PUSCH) transmission with HARQ-ACK information and/or SR; a third priority: PUCCH transmission with channel state information (CSI) or PUSCH transmission with CSI; a fourth priority: PUSCH transmission without HARQ-ACK information or CSI, and PUSCH transmission on a PCell of a type-2 random access procedure; a fifth priority: sounding reference signal (SRS) transmission, where a priority of an aperiodic SRS is higher than that of a semi-permanent and/or periodic SRS, or PRACH transmission on a serving cell other than the PCell.

Optionally, in case of determining the priority of the respective connection according to the channel type, a priority of a type of a downlink channel is determined according to at least one of the following methods: a priority of a synchronization signal (SS)/physical broadcast channel (PBCH) being higher than priorities of other downlink channels; priorities of a SS/PBCH and a PDCCH for a type-0 common search space (CSS) used for receiving system information being higher than priorities of other downlink channels; a priority of a SS/PBCH and/or a type-0 CSS being higher than a priority of a PDCCH for a type-1 CSS; the priority of the PDCCH for the type-1 CSS being higher than a priority of a PDCCH for a type-2 CSS; the priority of the PDCCH for the type-2 CSS being higher than a priority of a PDCCH for a user specific search space (USS); a priority of a PDCCH being higher than a priority of a PDSCH.

Optionally, in case of determining the priority of the respective connection according to the carrier/cell type, a priority of a carrier/cell is determined according to at least one of the following methods: a priority of a primary cell (Pcell) being higher than a priority of a secondary cell (Scell); a priority of a carrier/cell in a primary cell group (or master cell group (MCG)) being higher than a priority of a carrier/cell in a secondary cell group (SCG); a priority of a carrier/cell that carries a physical uplink control channel (PUCCH) being higher than a priority of a carrier/cell that does not carry the PUCCH; a priority of a non-supplementary carrier being higher than a priority of a supplementary carrier; a priority of a carrier/cell of a non-public network (NPN) being higher than a priority of a carrier/cell of a public land mobile network (PLMN); the priority of the carrier/cell of the PLMN being higher than the priority of the carrier/cell of the NPN; a priority of a carrier/cell of an independent non-public network being higher than a priority of a carrier/cell of a NPN based on a PLMN network; the priority of the carrier/cell of the NPN based on the PLMN network being higher than the priority of the carrier/cell of the independent non-public network; a priority order of a serving cell of respective SIM card being determined based on UE settings.

Optionally, in case of determining the priority of the respective connection according to the transmission procedure, a priority of a connection is determined according to at least one of the following methods: a first priority: an initial access procedure; a second priority: a random access procedure or a RRC connection establishment procedure; a third priority: a procedure of receiving paging messages; a fourth priority: other procedures.

Optionally, in case of determining the priority of the respective connection according to the service type, a priority of a connection is determined according to at least one of the following methods: determining the priority according to priority information of a configured physical channel or signal; determining the priority according to priority information of a service.

Optionally, in case of determining the priority of the respective connection according to the carrier/cell frequency point, a priority of a connection is determined according to a principle that a priority of a carrier/cell of a low frequency band of a connection is higher than a priority of a carrier/cell of a high frequency band of a connection.

The method further includes: reporting, by the UE, interaction capability of each connection to the base station; selecting, by the UE, a connection based on configuration information including a connection selection method from the base station, where, when the UE has multiple connections, the UE divides the multiple connections into one or more connection groups based on the configuration information from the base station, each connection group includes one or more connections, and where, the UE selects a connection in a respective connection group based on the configuration information from the base station, and allocates power to the connection.

Optionally, the interaction capability is reported per frequency point, or per RAT, or per SIM card, and where, the connection selection method is configured per frequency, or per RAT, or per SIM card, or per connection group.

The method further includes: transmitting, by the UE, assist information to the base station side; receiving, by the UE, scheduling information configured by the base station with reference to the assist information, from the base station; performing, by the UE, communication based on the scheduling information of the base station.

Optionally, the assist information includes at least one of: timing information of reception/transmission; resource occupancy information; RRC state; SS/PBCH configuration information; PDCCH detection information; resource configuration information used for receiving paging messages; RACH resource configuration information; configuration information for HARQ-ACK feedback; a minimum guaranteed transmit power when the UE connects with B; a maximum transmit power when the UE connects with B; a number of supportable links; supportable transmit power; supportable beam information; priority information; information that scheduling of the base station cannot be responded; in-device interference information; DRX configuration; and a channel state information (CSI) processing unit.

According to another aspect of the present disclosure, there is provided a user equipment including a transceiver and a controller, the user equipment being configured to perform the above method.

FIG. 1 illustrates an example wireless network 100 according to various embodiments of the present disclosure. The embodiment of the wireless network 100 shown in FIG. 1 is for illustration only. Other embodiments of the wireless network 100 can be used without departing from the scope of the present disclosure.

The wireless network 100 includes a gNodeB (gNB) 101, a gNB 102, and a gNB 103. GNB 101 communicates with gNB 102 and gNB 103. GNB 101 also communicates with at least one internet protocol (IP) network 130, such as the Internet, a private IP network, or other data networks.

Depending on a type of the network, other well-known terms such as "base station" or "access point" can be used instead of "gNodeB" or "gNB". For convenience, the terms "base station", "gNodeB" and "gNB" are used in this patent document to refer to network infrastructure components that provide wireless access for remote terminals. And, depending on the type of the network, other well-known terms such as "mobile station", "user station", "terminal", "remote terminal", "wireless terminal" or "user apparatus" can be used instead of "user equipment" or "UE". For convenience, the terms "user equipment", "UE" and "terminal" are used in this patent document to refer to remote wireless devices that wirelessly access the gNB, no matter whether the UE is a mobile device (such as a mobile phone or a smart phone) or a fixed device (such as a desktop computer or a vending machine).

gnb 102 provides wireless broadband access to the network 130 for a first plurality of user equipments (UEs) within a coverage area 120 of gNB 102. The first plurality of UEs include a UE 111, which may be located in a small business (SB); a UE 112, which may be located in an enterprise (E); a UE 113, which may be located in a WiFi hotspot (HS); a UE 114, which may be located in a first residence (R); a UE 115, which may be located in a second residence (R); a UE 116, which may be a mobile device (M), such as a cellular phone, a wireless laptop computer, a wireless PDA, etc. GNB 103 provides wireless broadband access to network 130 for a second plurality of UEs within a coverage area 125 of gNB 103. The second plurality of UEs include a UE 115 and a UE 116. In some embodiments, one or more of gNBs 101-103 can communicate with each other and with UEs 111-116 using 6G, 5G, long term evolution (LTE), LTE-A, WiMAX or other advanced wireless communication technologies.

The dashed lines show approximate ranges of the coverage areas 120 and 125, and the ranges are shown as approximate circles merely for illustration and explanation purposes. It should be clearly understood that the coverage areas associated with the gNBs, such as the coverage areas 120 and 125, may have other shapes, including irregular shapes, depending on configurations of the gNBs and changes in the radio environment associated with natural obstacles and man-made obstacles.

As will be described in more detail below, one or more of gNB 101, gNB 102, and gNB 103 include a 2D antenna array as described in embodiments of the present disclosure. In some embodiments, one or more of gNB 101, gNB 102, and gNB 103 support codebook designs and structures for systems with 2D antenna arrays.

Although FIG. 1 illustrates an example of the wireless network 100, various changes can be made to FIG. 1. The wireless network 100 can include any number of gNBs and any number of UEs in any suitable arrangement, for example. Furthermore, gNB 101 can directly communicate with any number of UEs and provide wireless broadband access to the network 130 for those UEs. Similarly, each gNB 102-103 can directly communicate with the network 130 and provide direct wireless broadband access to the network 130 for the UEs. In addition, gNB 101, 102 and/or 103 can provide access to other or additional external networks, such as external telephone networks or other types of data networks.

Figure 2A:
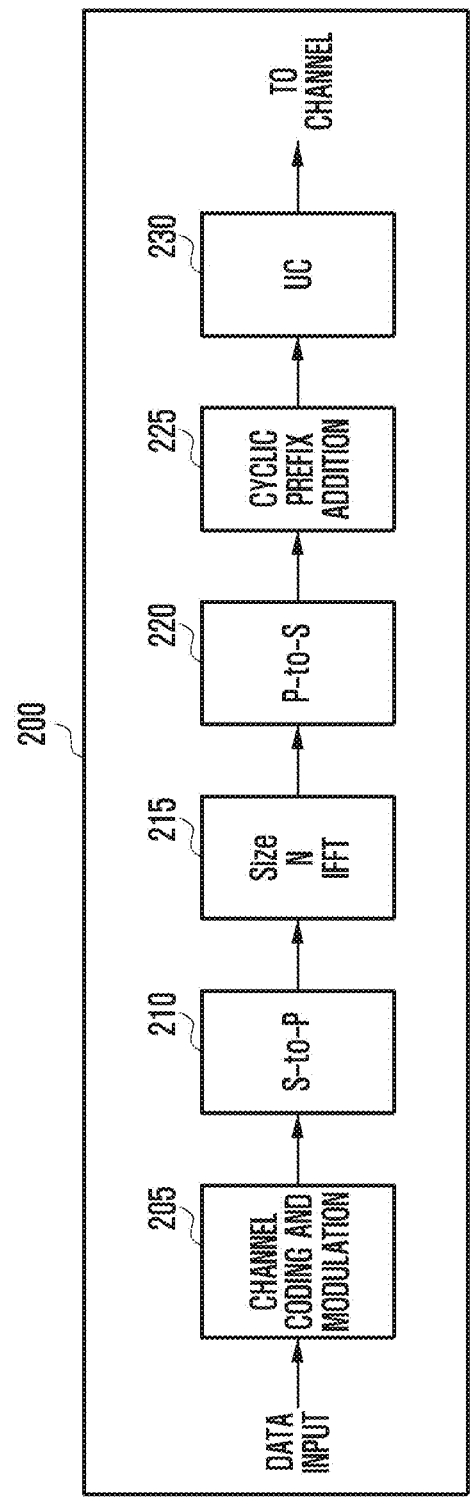
FIGS. 2a and 2b illustrate example wireless transmission and reception paths according to the present disclosure.
Figure 2B:
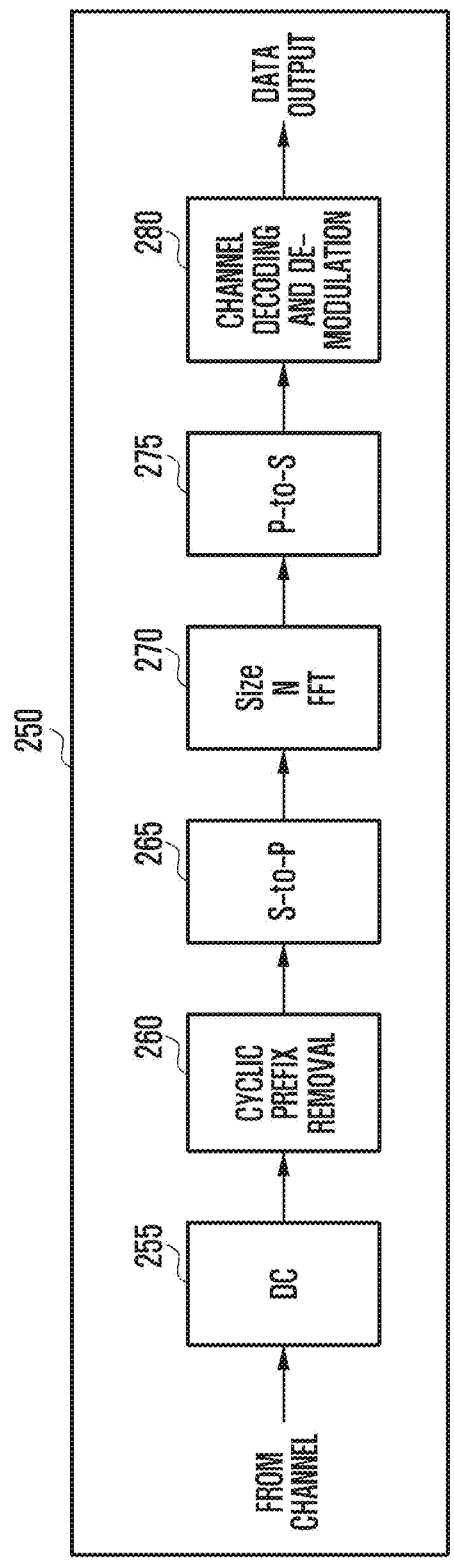

FIGS. 2a and 2b illustrate example wireless transmission and reception paths according to the present disclosure. In the following description, the transmission path 200 can be described as being implemented in a gNB, such as gNB 102, and the reception path 250 can be described as being implemented in a UE, such as UE 116. However, it should be understood that the reception path 250 can be implemented in a gNB and the transmission path 200 can be implemented in a UE. In some embodiments, the reception path 250 is configured to support codebook designs and structures for systems with 2D antenna arrays as described in embodiments of the present disclosure.

The transmission path 200 includes a channel coding and modulation block 205, a serial-to-parallel (S-to-P) block 210, a size N inverse fast Fourier transform (IFFT) block 215, a parallel-to-serial (P-to-S) block 220, a cyclic prefix addition block 225, and an up-converter (UC) 230. The reception path 250 includes a down-converter (DC) 255, a cyclic prefix removal block 260, a Serial-to-Parallel (S-to-P) block 265, a size N fast Fourier transform (FFT) block 270, a parallel-to-serial (P-to-S) block 275, and a channel decoding and demodulation block 280.

In the transmission path 200, the channel coding and modulation block 205 receives a set of information bits, applies coding (such as low density parity check (LDPC) coding), and modulates the input bits (such as using quadrature phase shift keying (QPSK) or quadrature amplitude modulation (QAM)) to generate a sequence of frequency-domain modulated symbols. The Serial-to-Parallel (S-to-P) block 210 converts (such as demultiplexes) serial modulated symbols into parallel data to generate N parallel symbol streams, where N is a size of the IFFT/FFT used in gNB 102 and UE 116. The size N IFFT block 215 performs IFFT operations on the N parallel symbol streams to generate a time-domain output signal. The Parallel-to-Serial block 220 converts (such as multiplexes) parallel time-domain output symbols from the Size N IFFT block 215 to generate a serial time-domain signal. The cyclic prefix addition block 225 inserts a cyclic prefix into the time-domain signal. The up-converter 230 modulates (such as up-converts) the output of the cyclic prefix addition block 225 to an RF frequency for transmission via a wireless channel. The signal can also be filtered at a baseband before conversion to the RF frequency.

The RF signal transmitted from gNB 102 arrives at UE 116 after passing through the wireless channel, and operations in reverse to those at gNB 102 are performed at UE 116. The down-converter 255 down-converts the received signal to a baseband frequency, and the cyclic prefix removal block 260 removes the cyclic prefix to generate a serial time-domain baseband signal. The Serial-to-Parallel block 265 converts the time-domain baseband signal into a parallel time-domain signal. The Size N FFT block 270 performs an FFT algorithm to generate N parallel frequency-domain signals. The Parallel-to-Serial block 275 converts the parallel frequency-domain signal into a sequence of modulated data symbols. The channel decoding and demodulation block 280 demodulates and decodes the modulated symbols to recover the original input data stream.

Each of gNBs 101-103 may implement a transmission path 200 similar to that for transmitting to UEs 111-116 in the downlink, and may implement a reception path 250 similar to that for receiving from UEs 111-116 in the uplink. Similarly, each of UEs 111-116 may implement a transmission path 200 for transmitting to gNBs 101-103 in the uplink, and may implement a reception path 250 for receiving from gNBs 101-103 in the downlink.

Each of the components in FIGS. 2a and 2b can be implemented using only hardware, or using a combination of hardware and software/firmware. As a specific example, at least some of the components in FIGS. 2a and 2b may be implemented in software, while other components may be implemented in configurable hardware or a combination of software and configurable hardware. For example, the FFT block 270 and IFFT block 215 may be implemented as configurable software algorithms, in which the value of the size N may be modified according to the implementation.

Furthermore, although described as using FFT and IFFT, this is only illustrative and should not be interpreted as limiting the scope of the present disclosure. Other types of transforms can be used, such as discrete Fourier transform (DFT) and inverse discrete Fourier transform (IDFT) functions. It should be understood that for DFT and IDFT functions, the value of variable N may be any integer (such as 1, 2, 3, 4, etc.), while for FFT and IFFT functions, the value of variable N may be any integer which is a power of 2 (such as 1, 2, 4, 8, 16, etc.).

Although FIGS. 2a and 2b illustrate examples of wireless transmission and reception paths, various changes may be made to FIGS. 2a and 2b. For example, various components in FIGS. 2a and 2b can be combined, further subdivided or omitted, and additional components can be added according to specific requirements. Furthermore, FIGS. 2a and 2b are intended to illustrate examples of types of transmission and reception paths that can be used in a wireless network. Any other suitable architecture can be used to support wireless communication in a wireless network.

Figure 3A:
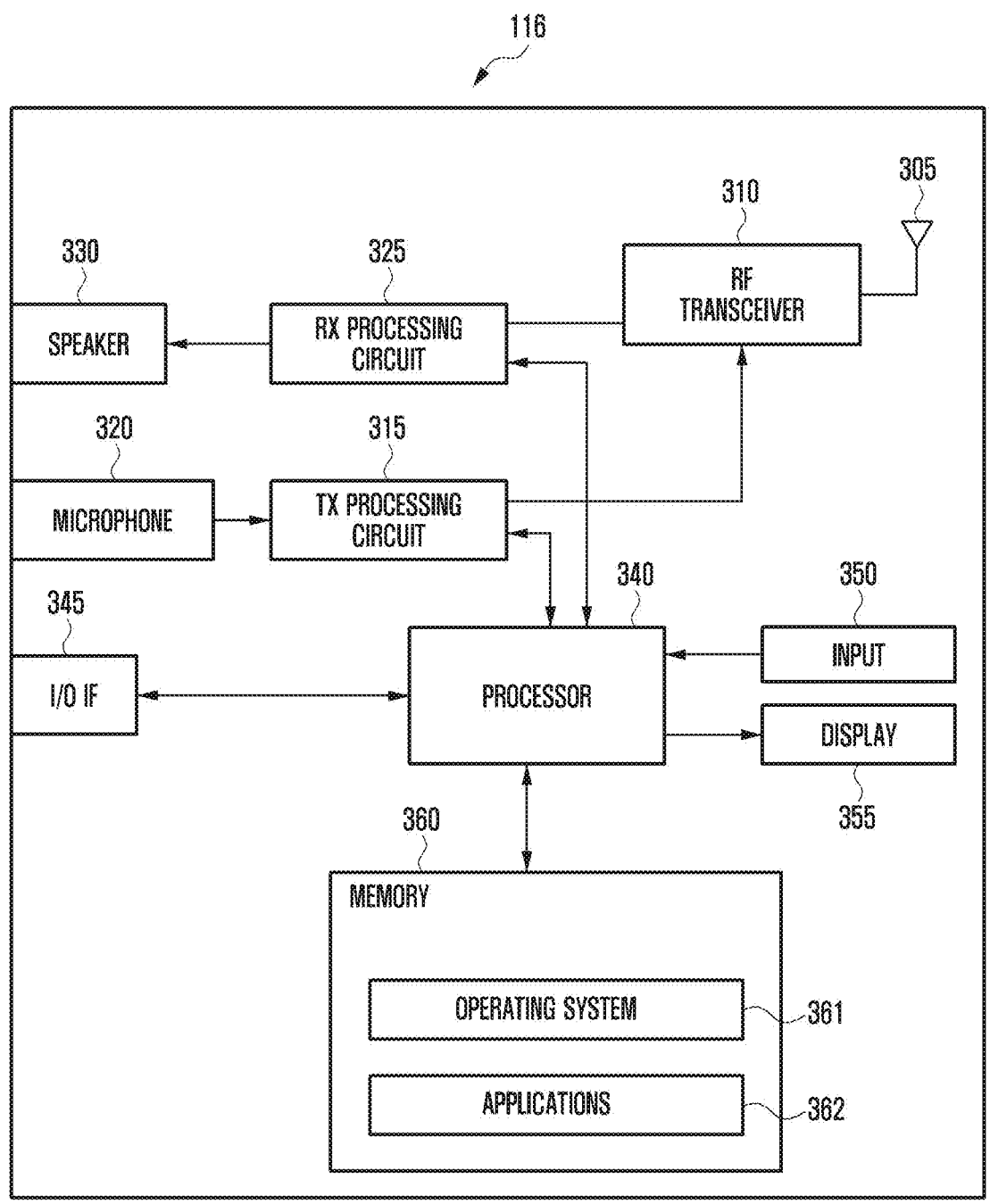
FIG. 3a illustrates an example user equipment according to the present disclosure.

FIG. 3a illustrates an example UE 116 according to the present disclosure. The embodiment of UE 116 shown in FIG. 3a is for illustration only, and UEs 111-115 of FIG. 1 can have the same or similar configuration. However, a UE has various configurations, and FIG. 3a does not limit the scope of the present disclosure to any specific implementation of the UE.

UE 116 includes an antenna 305, a radio frequency (RF) transceiver 310, a transmission (TX) processing circuit 315, a microphone 320, and a reception (RX) processing circuit 325. UE 116 also includes a speaker 330, a processor/controller 340, an input/output (I/O) interface 345, an input device(s) 350, a display 355, and a memory 360. The memory 360 includes an operating system (OS) 361 and one or more disclosures 362.

The RF transceiver 310 receives an incoming RF signal transmitted by a gNB of the wireless network 100 from the antenna 305. The RF transceiver 310 down-converts the incoming RF signal to generate an intermediate frequency (IF) or baseband signal. The IF or baseband signal is transmitted to the RX processing circuit 325, where the RX processing circuit 325 generates a processed baseband signal by filtering, decoding and/or digitizing the baseband or IF signal. The RX processing circuit 325 transmits the processed baseband signal to speaker 330 (such as for voice data) or to processor/controller 340 for further processing (such as for web browsing data).

The TX processing circuit 315 receives analog or digital voice data from microphone 320 or other outgoing baseband data (such as network data, email or interactive video game data) from processor/controller 340. The TX processing circuit 315 encodes, multiplexes, and/or digitizes the outgoing baseband data to generate a processed baseband or IF signal. The RF transceiver 310 receives the outgoing processed baseband or IF signal from the TX processing circuit 315 and up-converts the baseband or IF signal into an RF signal transmitted via the antenna 305.

The processor/controller 340 can include one or more processors or other processing devices and execute an OS 361 stored in the memory 360 in order to control the overall operation of UE 116. For example, the processor/controller 340 can control the reception of forward channel signals and the transmission of backward channel signals through the RF transceiver 310, the RX processing circuit 325 and the TX processing circuit 315 according to well-known principles. In some embodiments, the processor/controller 340 includes at least one microprocessor or microcontroller.

The processor/controller 340 is also capable of executing other processes and programs residing in the memory 360, such as operations for channel quality measurement and reporting for systems with 2D antenna arrays as described in embodiments of the present disclosure. The processor/controller 340 can move data into or out of the memory 360 as required by an execution process. In some embodiments, the processor/controller 340 is configured to execute the disclosure 362 based on the OS 361 or in response to signals received from the gNB or the operator. The processor/controller 340 is also coupled to an I/O interface 345, where the I/O interface 345 provides UE 116 with the ability to connect to other devices such as laptop computers and handheld computers. I/O interface 345 is a communication path between these accessories and the processor/controller 340.

The processor/controller 340 is also coupled to the input device(s) 350 and the display 355. An operator of UE 116 can input data into UE 116 using the input device(s) 350. The display 355 may be a liquid crystal display or other display capable of presenting text and/or at least limited graphics (such as from a website). The memory 360 is coupled to the processor/controller 340. A part of the memory 360 can include a random access memory (RAM), while another part of the memory 360 can include a flash memory or other read-only memory (ROM).

Although FIG. 3a illustrates an example of UE 116, various changes can be made to FIG. 3a to achieve various implementations of the present disclosure. For example, various components in FIG. 3a can be combined, further subdivided or omitted, and additional components can be added according to specific requirements. As a specific example, the processor/controller 340 can be divided into a plurality of processors, such as one or more central processing units (CPUs) and one or more graphics processing units (GPUs). Furthermore, although FIG. 3a illustrates that the UE 116 is configured as a mobile phone or a smart phone, UEs can be configured to operate as other types of mobile or fixed devices.

Figure 3B:
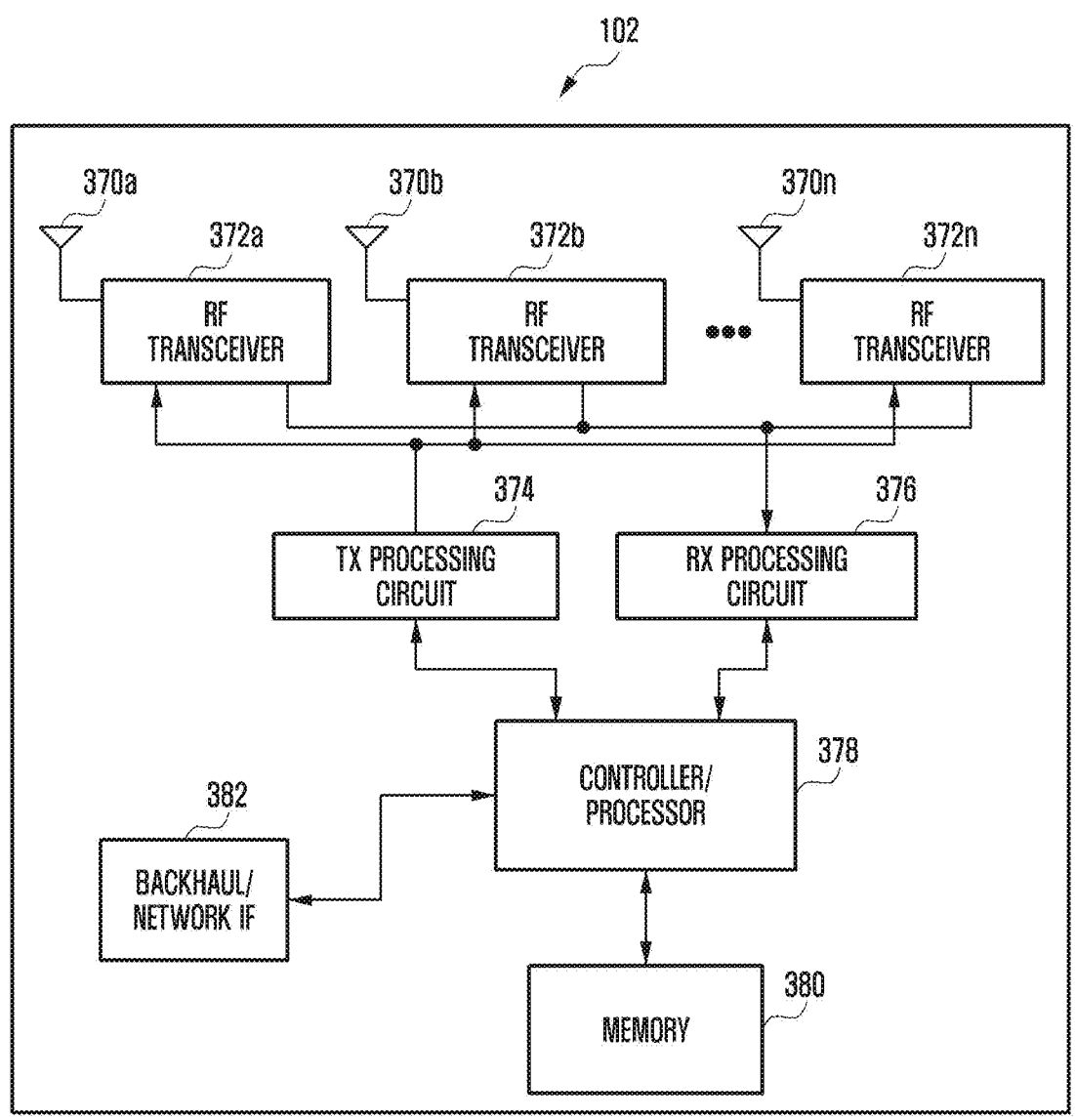
FIG. 3b illustrates an example base station according to the present disclosure.

FIG. 3b illustrates an example gNB 102 according to the present disclosure. The embodiment of gNB 102 shown in FIG. 3b is for illustration only, and other gNBs of FIG. 1 can have the same or similar configuration. However, a gNB has various configurations, and FIG. 3b does not limit the scope of the present disclosure to any specific implementation of a gNB. It should be noted that gNB 101 and gNB 103 can include the same or similar structures as gNB 102.

As shown in FIG. 3b, gNB 102 includes a plurality of antennas 370a-370n, a plurality of RF transceivers 372a-372n, a transmission (TX) processing circuit 374, and a reception (RX) processing circuit 376. In certain embodiments, one or more of the plurality of antennas 370a-370n include a 2D antenna array. GNB 102 also includes a controller/processor 378, a memory 380, and a backhaul or network interface 382.

RF transceivers 372a-372n receive an incoming RF signal from antennas 370a-370n, such as a signal transmitted by UEs or other gNBs. RF transceivers 372a-372n downconvert the incoming RF signal to generate an IF or baseband signal. The IF or baseband signal is transmitted to the RX processing circuit 376, where the RX processing circuit 376 generates a processed baseband signal by filtering, decoding and/or digitizing the baseband or IF signal. RX processing circuit 376 transmits the processed baseband signal to controller/processor 378 for further processing.

The TX processing circuit 374 receives analog or digital data (such as voice data, network data, email or interactive video game data) from the controller/processor 378. TX processing circuit 374 encodes, multiplexes and/or digitizes outgoing baseband data to generate a processed baseband or IF signal. RF transceivers 372a-372n receive the outgoing processed baseband or IF signal from TX processing circuit 374 and up-convert the baseband or IF signal into an RF signal transmitted via antennas 370a-370n.

The controller/processor 378 can include one or more processors or other processing devices that control the overall operation of gNB 102. For example, the controller/processor 378 can control the reception of forward channel signals and the transmission of backward channel signals through the RF transceivers 372a-372n, the RX processing circuit 376 and the TX processing circuit 374 according to well-known principles. The controller/processor 378 can also support additional functions, such as higher-level wireless communication functions. For example, the controller/processor 378 can perform a Blind Interference Sensing (BIS) process such as that performed through a BIS algorithm, and decode a received signal from which an interference signal is subtracted. A controller/processor 378 may support any of a variety of other functions in gNB 102. In some embodiments, the controller/processor 378 includes at least one microprocessor or microcontroller.

The controller/processor 378 is also capable of executing programs and other processes residing in the memory 380, such as a basic OS. The controller/processor 378 can also support channel quality measurement and reporting for systems with 2D antenna arrays as described in embodiments of the present disclosure. In some embodiments, the controller/processor 378 supports communication between entities such as web RTCs. The controller/processor 378 can move data into or out of the memory 380 as required by an execution process.

The controller/processor 378 is also coupled to the backhaul or network interface 382. The backhaul or network interface 382 allows gNB 102 to communicate with other devices or systems through a backhaul connection or through a network. The backhaul or network interface 382 can support communication over any suitable wired or wireless connection(s). For example, when gNB 102 is implemented as a part of a cellular communication system, such as a cellular communication system supporting 6G or 5G or new radio access technology or NR, LTE or LTE-A, the backhaul or network interface 382 can allow gNB 102 to communicate with other gNBs through wired or wireless backhaul connections. When gNB 102 is implemented as an access point, the backhaul or network interface 382 can allow gNB 102 to communicate with a larger network, such as the Internet, through a wired or wireless local area network or through a wired or wireless connection. The backhaul or network interface 382 includes any suitable structure that supports communication through a wired or wireless connection, such as an Ethernet or an RF transceiver.

The memory 380 is coupled to the controller/processor 378. A part of the memory 380 can include an RAM, while another part of the memory 380 can include a flash memory or other ROMs. In certain embodiments, a plurality of instructions, such as the BIS algorithm, are stored in the memory. The plurality of instructions are configured to cause the controller/processor 378 to execute the BIS process and decode the received signal after subtracting at least one interference signal determined by the BIS algorithm.

As will be described in more detail below, the transmission and reception paths of gNB 102 (implemented using RF transceivers 372a-372n, TX processing circuit 374 and/or RX processing circuit 376) support aggregated communication with FDD cells and TDD cells.

Although FIG. 3b illustrates an example of gNB 102, various changes may be made to FIG. 3b to achieve various implementations of the present disclosure. For example, gNB 102 can include any number of each component shown in FIG. 3a. As a specific example, the access point can include many backhaul or network interfaces 382, and the controller/processor 378 can support routing functions to route data between different network addresses. As another specific example, although shown as including a single instance of the TX processing circuit 374 and a single instance of the RX processing circuit 376, gNB 102 can include multiple instances of each (such as one for each RF transceiver).

The exemplary embodiments of the present disclosure are further described below in conjunction with the accompanying drawings.

The text and drawings are provided as examples only to help readers understand the present disclosure. They are not intended and should not be interpreted as limiting the scope of the present disclosure in any way. Although certain embodiments and examples have been provided, based on the content disclosed herein, it is obvious to those skilled in the art that modifications to the illustrated embodiments and examples can be made without departing from the scope of the present disclosure.

In the existing communication systems, a UE may establish connections with multiple carriers of a base station through carrier aggregation (CA). In carrier aggregation, the UE may maintain connections with 16 or 32 carriers at most. A UE may also establish connections with two base stations by way of dual-connectivity. With the emergence of new types of networks, such as the emergence of non-public networks (NPNs), a UE may need to be connected in different networks simultaneously, for example, to be connected in the NPN and the public land mobile network (PLMN) simultaneously. Networks based on various access technologies will coexist within a period of time, such as LTE, NR and 6G networks, and a UE may need to be connected in different networks simultaneously. Moreover, with the expansion of available carrier frequency domain, for example, with the emergence of frequency points below 1 GHz, frequency points above 1 GHz and below 6 GHz, as well as millimeter wave bands, and even terahertz bands in the future, a UE may need to be connected in different frequency points simultaneously, in order to meet requirements of coverage and high speed. In addition, as the cooperation among various operators deepens, a UE may be served by multiple operators simultaneously.

Based on these requirements, a UE may need to establish connections with more than two networks simultaneously. One or more embodiments of the present disclosure propose a multi-connection-based working mode to improve the existing transmission method to improve the overall system efficiency.

Figure 4:
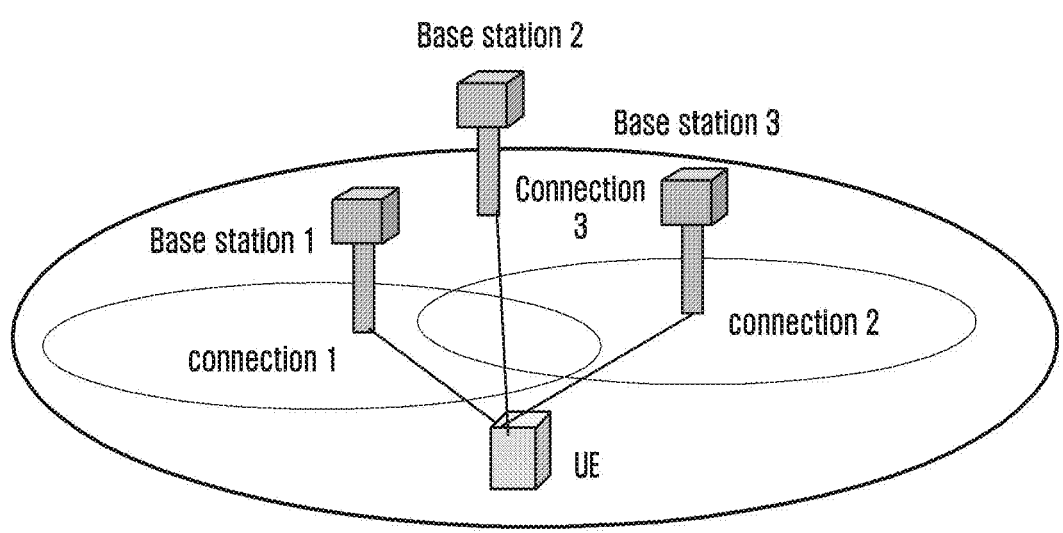
FIG. 4 illustrates a diagram of an exemplary connection between a UE and a base station.

FIG. 4 illustrates a diagram of an exemplary connection between a UE and a base station.

In FIG. 4, the UE has three connections with three base stations. The UE may select one or more connections from the three connections to perform communication according to configuration information of the base stations. Although three connections between the UE and three base stations are shown in FIG. 4, a number of base stations and a number of connections are not limited thereto. For example, the number of base stations may be two or more, and for example, the UE may establish one or more connections with each base station. Moreover, the respective base stations may be of a same network type and/or may be a same operator, or may be of different network types and/or may be different operators.

Figure 5:
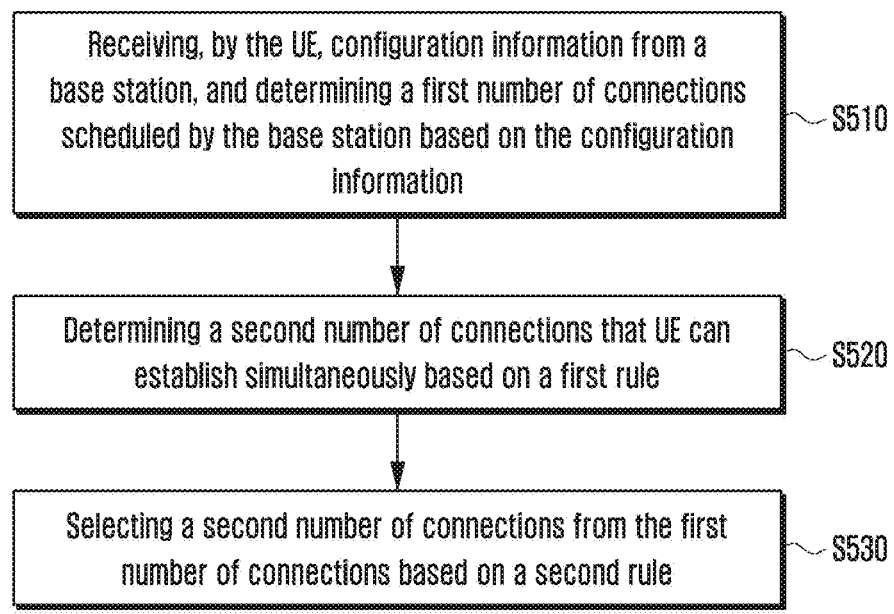
FIG. 5 illustrates a flowchart of a method performed by a UE according to an embodiment of the present disclosure.

FIG. 5 illustrates a flowchart of a method for a UE to select a connection according to an exemplary embodiment of the present disclosure.

S510, the UE receives configuration information from a base station, and determines a first number of connections scheduled by the base station based on the configuration information;

S520, the UE determines a second number of connections that the UE may establish simultaneously based on a first rule;

S530, UE selects a second number of connections from the first number of connections based on a second rule.

In step S510, for a UE with L connections, the UE receives configuration information from the base station, and determines that it is scheduled by the base station to simultaneously receive or transmit on the first number N (N≤L) of connections, based on the configuration information.

In step S520, the UE determines the second number M of connections that the UE may establish simultaneously based on the first rule. According to an implementation, a second number Mrev of connections on which the UE may simultaneously receive is as same as a number Mtrans of connections on which the UE may simultaneously transmit. According to another implementation, the second number Mrev of connections on which the UE may simultaneously receive is different from the number Mtrans of connections on which the UE may simultaneously transmit.

The factors that cause the UE to be able to transmit/receive only on the second number M of connections may be diversified, including but not limited to, the UE having only M radio frequency channels, or the UE having only M baseband processing branches that may be used for parallel processing, or the UE having only M beams that may be simultaneously used for transmission, or the UE UE having only M beams that may be simultaneously used for reception, and so on.

According to an implementation of the present disclosure, the first rule used by the UE to determine the second number M of connections includes at least one of:

the second number not exceeding a number of radio frequency channels possessed by the UE;

the second number not exceeding a number of baseband processing branches that may be used for parallel processing possessed by the UE;

the second number not exceeding a number of beams that may be simultaneously used for transmission possessed by the UE;

the second number not exceeding a number of beams that may be simultaneously used for reception possessed by the UE;

a sum of transmit power expected for the second number of connections not exceeding a predefined maximum transmit power;

a number of directions of transmission beams expected for the second number of directions not exceeding a third number;

a number of directions of reception beams expected for the second number of directions not exceeding the third number.

According to an implementation, for a UE with L connections, in case that the UE receives configuration information from the base station, and determines that it is scheduled by the base station to simultaneously receive or transmit on N (N≤L) connections based on the configuration information, if the UE only has M radio frequency channels, then the UE determines that the second number of connections that may be established simultaneously is M based on the first rule.

According to an implementation, for a UE with L connections, in case that the UE is scheduled to transmit on N (N≤L) connections simultaneously, if a sum of transmit power expected for the N connections exceeds the predefined maximum transmit power, then the UE determines that the second number of connections that may be established simultaneously is M, based on the first rule, so that a sum of the transmit power of the M connections does not exceed the predefined maximum transmit power.

According to an implementation, for a UE with L connections, in case that the UE is scheduled to transmit on N (N≤L) connections simultaneously, if a number of directions of transmission beams expected for the N connections exceeds a threshold M1 of the number of beam directions, then the UE determines that the second number of connections that may be established simultaneously is M based on the first rule, so that a total number of directions of the reception beams of the M connections does not exceed the threshold M1 of the number of beam directions.

According to an implementation, for a UE with L connections, in case that the UE is scheduled to receive on N (N≤L) connections simultaneously, if a number of directions of reception beams expected for the N connections exceeds a threshold M1 of the number of beam directions, then the UE determines that the second number of connections that may be established simultaneously is M based on the first rule, so that a total number of directions of the reception beams of the M connections does not exceed the threshold M1 of the number of beam directions.

According to an implementation, for example, a UE with L=4 connections is scheduled to transmit on N=3 connections simultaneously, if a number of directions of transmission beams expected for the N=3 connections is 3, which exceeds a threshold M1=2 of the number of beam directions, due to that each connection has a different transmission beam direction, then it is necessary to select at most M=2 connections from the N=3 connections according to a predefined rule, where a total number of directions of transmission beams for the 2 connections does not exceed the threshold M1=2 of the number of beam directions. For another example, if the beam directions of the first and second connections in the N=3 connections are the same, and the beam direction for the third connection is different from the beam direction for the 1/2 beam direction, then M=3 and M1=2.

According to an implementation, M=2 connections are selected according to the predefined rule so that a total number of different beam directions does not exceed M1=2. For the remaining N−M=2 connections, they may select from the M1=2 beam directions a beam direction for itself for transmission, or they may abandon transmission. For example, in case that the UE maintains connections with the LTE and NR base stations simultaneously, but the UE may only receive in one beam direction at a time. According to the predefined rule, a connection with a higher priority is selected from the two connections, and downlink reception is performed according to a beam transmission direction indicated by the base station. For the reception of a connection with a lower priority, the UE may not receive according to the beam information indicated by the base station, but receive in a reception beam direction as same as that of the connection with the higher priority. For another example, the UE maintains connections with the LTE and NR base stations simultaneously, but the UE may only transmit in one beam direction at a time. According to the predefined rule, a connection with a higher priority is selected from the two connections, and uplink reception is performed according to the beam transmission direction indicated by the base station, and the other connection is transmitted in the same beam direction. If it is considered that changing the transmission beam direction may cause unpredictable interference, the UE abandons transmitting a signal with a low priority, if the direction of the transmission beam of the signal is different from the beam of a signal with a high priority signal in terms of direction. Optionally, the base station configures multiple transmission beam directions, and the UE may select one of the beam directions, so that the total number of directions of beams transmitted simultaneously does not exceed M. If the UE cannot select a beam that meets the requirements, the UE abandons transmitting signals with a low priority. Optionally, the base station may configure one optimal beam and at least one alternative beam. When the transmission beams of the UE are not limited, the optimal beam may be used for transmission. If the transmission beams of the UE are limited, the alternative beams may be selected for transmission.

According to an implementation, M and/or M1 are determined by the UE, and the UE may notify the base station of information on M or M1.

In the L connections of a communication device, each connection may contain one or more carriers/cells. Carriers/cells belonging to a same connection may work in the way of carrier aggregation to determine the reception or transmission of carriers/cells in the connection. Alternatively, carriers/cells belonging to the same connection determine the reception or transmission according to the rules of the present invention. Alternatively, the reception or transmission are determined according to a combination of the rules in the present invention and the carrier aggregation method.

In step S530, the UE selects the second number of connections from the first number of connections based on the second rule. According to an implementation, the UE determines the priorities of respective connections based on the second rule, and selects the second number of connections in a descending order of priority.

According to an implementation, M and/or M1 are determined by the UE, and the UE may notify the base station of information on M or M1.

In the L connections of a communication device, each connection may contain one or more carriers/cells. Carriers/cells belonging to a same connection may work in the way of carrier aggregation to determine the reception or transmission of carriers/cells in the connection. Alternatively, carriers/cells belonging to the same connection determine the reception or transmission according to the rules of the present invention. Alternatively, the reception or transmission are determined according to a combination of the rules in the present invention and the carrier aggregation method.

In step S530, the UE selects the second number of connections from the first number of connections based on the second rule. According to an implementation, the UE determines the priorities of respective connections based on the second rule, and selects the second number of connections in a descending order of priority.

According to an implementation of the present disclosure, the second rule includes at least one of:

priorities of a SS/PBCH and a PDCCH for a type-0 (Type-0) common search space (CSS) being higher than priorities of other downlink channels;

a priority of a SS/PBCH and/or a type-0 CSS being higher than a priority of a PDCCH for a type-1 (Type-1) CSS;

For example, the Type-1 CSS is a CSS used for receiving other system information, a CSS used for receiving a random access response (RAR), a CSS for receiving a paging message.

the priority of the PDCCH for the type-1 CSS being higher than a priority of a PDCCH for a type-2 (Type-2) CSS. For example, the Type-2 CSS is a CSS for a PDCCH for receiving uplink and downlink configuration, a PDCCH for uplink power control of a set of UEs, a PDCCH for scheduling a backoff DCI of data.

the priority of the PDCCH for the Type-2 CSS being higher than a priority of a PDCCH for a user specific search space (USS);

a priority of a PDCCH being higher than a priority of a PDSCH.

(2) The priorities of the respective connections are determined according to the carrier/cell type. According to a descending order of priority, M connections are selected for corresponding operations. For example, the priorities of different types of carriers/cells are determined according to at least one of the following methods:

a priority of a Pcell being higher than a priority of a Scell;

a priority of a carrier/cell in a primary cell group (or master cell group (MCG)) being higher than a priority of a carrier/cell in a secondary cell group (SCG);

Optionally, in a SCG, a priority of a carrier/cell with a low SCG index being higher than a priority of a carrier/cell with a high SCG index.

a priority of a carrier/cell that carries a physical uplink control channel (PUCCH) being higher than a priority of a carrier/cell that does not carry the PUCCH;

a priority of a non-supplementary carrier being higher than a priority of a supplementary carrier;

a priority of a carrier/cell of a non-public network (NPN) being higher than a priority of a carrier/cell of a public land mobile network (PLMN);

the priority of the carrier/cell of the PLMN being higher than the priority of the carrier/cell of the NPN;

a priority of a carrier/cell of an independent non-public network being higher than a priority of a carrier/cell of a NPN based on a PLMN network;

the priority of the carrier/cell of the NPN based on the PLMN network being higher than the priority of the carrier/cell of the independent non-public network;

a priority order of a serving cell of a respective SIM card being determined based on terminal settings (for example, factory settings or user settings).

For example, for a dual-card dual-standby terminal customized by China Mobile, a priority of China Mobile's SIM card is higher than that of other operators' SIM cards.

For another example, a priority of a SIM card in a card slot 1 is higher than a priority of a SIM card in a card slot 2.

(3) The priorities of the respective connections are determined according to the transmission procedure. According to a descending order of priority, M connections are selected for corresponding operations. For example, the priorities of connections are determined according to at least one of the following methods:

A First Priority: An Initial Access Procedure

For example, the procedure may include cell searching and receiving SSs/PBCHs, or receiving SSs/PBCHs and SIB1 system information. For another example, when a primary carrier/primary cell radio link fails (RLF), the UE re-performs the initial access procedure.

A Second Priority: A Random Access Procedure or a RRC Connection Establishment Procedure For example, a random access procedure used by the UE to establish an RRC connection during initial access. Optionally, the random access procedure is a random access procedure based on four steps (transmitting a PRACH, receiving a RAR, transmitting an Msg3, receiving an Msg4), or a random access procedure based on two steps (Msg A PRACH+PUSCH, Msg B PDCCH+PDSCH).

A Third Priority: A Procedure of Receiving Paging Messages

A Fourth Priority: Other Procedures (4) The priorities of the respective connections are determined according to the service type. According to a descending order of priority, M connections are selected for corresponding operations. For example, the priorities of the connections are determined according to at least one of the following methods:

determining the priorities according to priority information of configured physical channels or signals determining the priorities according to priority information of services For example, a priority of a voice service is higher than a priority of a data service.

(5) The priorities of the respective connections are determined according to the carrier/cell frequency points. Priorities of connections are determined according to a principle that a priority of a carrier/cell of a low frequency band of a connection is higher than a priority of a carrier/cell of a high frequency band of a connection, and M connections are selected for corresponding operations.

The above-described rules and methods for determining priorities may be combined in various ways.

Although the steps are shown in a specific order in FIG. 4, this should not be understood as having to be performed in the order shown in the figure. For example, the operations shown in FIG. 4 may be performed in parallel or in a reverse order. For example, the UE may determine the second number and select the second number of connections from the first number of connections based on the first rule and the second rule.

According to an implementation of the present disclosure, the UE may notify the base station of the interaction capabilities of respective connections. The base station configures a connection selection method for the UE based on the interaction capabilities of the respective connections of the UE. The UE selects a connection for communication based on the configuration of the base station.

For example, the UE may report to the base station whether the UE has the capability to handle fast communication between two connected modules (for example, modems). For example, the two connections belong to different RATs respectively, or the two connections correspond to different SIM cards respectively. For example, the UE may report to the base station whether it has dynamic power sharing capability or semi-static power sharing capability with respect to the two connections. According to the different interaction capabilities of the UE, the base station may configure different methods for selecting connections. For example, for a UE with dynamic power sharing capability and a UE with semi-static power sharing capability, the base station may configure different connection selection methods. The UE selects a connection for communication based on the configuration of the base station.

Optionally, the interaction capabilities are reported per frequency point. Optionally, the interaction capabilities are reported per RAT. Optionally, the interaction capabilities are reported per SIM card.

For a UE, handling methods among respective connections or among respective carriers/cells within a connection may differ. For example, for multiple connections that may interact with each other or may interact in real time, the UE may adopt a more dynamic method of selecting connections according to the configuration of the base station, while for multiple connections with limited interactions, the UE may adopt a semi-static or fixed method of selecting connections. The base station may notify the UE of the method of selecting a connection among respective connections or within a connection. According to an implementation, when the UE has multiple connections, the base station may divide the multiple connections into one or more connection groups, and notify the UE of the method of selecting connections among the connections. For example, the UE establishes 3 connections, where connection 1 is NPN, connection 2 is PLMN, connection 3 is also PLMN, and connection 2 and connection 3 have different frequency points. The base station may notify the UE that connection 2 and connection 3 are a group, and that connection 1 is a group, and that connection selection across the two groups of connections are conducted in a semi-static manner. For example, transmit power allocation is conducted in a dynamic manner among respective connections within a same connection group, and the transmit power allocation is conducted in a semi-static manner among respective connections within different connection groups. For another example, the UE establishes 3 connections, where connection 1 is NPN, connection 2 is PLMN, and connection 3 is also PLMN. The UE has the capability to communicate with M=2 connections simultaneously. The base station may notify the UE that connection 2 and connection 3 are a group, and that connection 1 is a group, and that connections 2/3 share a connection channel, while connection 1 occupies a connection channel. The base station may further configure the UE to select a connection for communication between connections 2/3 in a semi-static or dynamic manner.

Optionally, the method of selecting connections is configured per frequency point. Optionally, the method of selecting connections is configured per RAT. Optionally, the method of selecting connections is configured per SIM card. Optionally, the method of selecting the connection is configured per connection group.

In order to assist in the scheduling decision at the base station side, the UE may transmit assist information to the base station side to inform the base station of the configuration desired by the UE, so that the base station refers to the UE assist information to configure scheduling information for the UE, and the UE performs communication based on the scheduling information of the base station, thereby reducing resource conflicts among multiple connections.

When the UE establishes multiple connections, the UE may inform a base station of a connection A of information on a connection B, or the UE may suggest reasonable configuration to the base station of the connection A. The suggested configuration information may be based on information on at least one of the connected base stations, or the information may be determined by the UE itself. By assisting in the scheduling decision of the base station in this way, resource conflicts among multiple connections may be reduced. The assist information may be carried by UE capability reporting signaling, or the assist information may be carried by signaling different from the UE capability reporting signaling. Generally, the UE capability is determined by factory settings, but the UE assist information is determined according to a number of connections maintained by the UE and characteristics of each of the connections. The assist information may be high-layer signaling or physical-layer signaling. The assist information includes at least one of the following information:

Timing Information of Reception/Transmission

Timing information for when the UE may perform downlink reception/uplink transmission with the base station of the connection A. For example, the uplink and downlink configuration information, or the timing pattern information of transmission and reception.

For example, if the UE establishes multiple connections, the UE may report desired uplink and downlink configuration information to the base station of the connection A. The uplink and downlink configuration information may be determined according to the cell-common uplink and downlink configuration information of the connection B. In this way, a base station A may avoid scheduling the UE's transmission in resources that conflict with the uplink and downlink transmissions of a base station B. For example, the UE establishes 2 connections, where connection 1 is a NPN and connection 2 is a PLMN. It is assumed that the UE may only maintain connection with one of the connections at a time. The UE may inform the base station of a NPN of uplink and downlink configuration information of a carrier/cell of a PLMN, in order to assist the base station of the NPN in scheduling the UE's uplink and downlink transmissions, thereby reducing loss of one of the connections caused by simultaneous scheduling of the UE by the two connections.

For another example, the UE may report, to the base station of the connection A, timing pattern information that the UE may transmit and receive with the connection A. The timing pattern information may indicate time resources on which the UE may transmit on an uplink carrier of the connection A and time resources on which the UE may receive on a downlink carrier of the connection A. Alternatively, the timing pattern information may indicate the time slots/symbols in the connection B that are determined not to be used for uplink transmission, or indicate the time slots/symbols in other connections expected by the connection B that are determined not to be used for serving the uplink transmission of the UE.

Resource Occupancy Information

For example, the UE reports expected resource occupancy information to the base station, for example, the UE reports to the base station of the connection A which time/frequency-domain/space-domain (such as beam direction) resources are expected to be occupied by the connection B, and a proportion of resources occupied, for example, 50% of the frequencies occupy these resources.

RRC State

For example, the UE may report a desired RRC state to the base station. The RRC state is at least one of a connected state, a RRC idle state, or a RRC inactive state. The UE may report timing information in which it is in the RRC state, for example, a duration of the RRC state, to the base station.

Alternatively, the UE may report the RRC state of the UE in the connection B to the base station of the connection A. The UE may further report timing information of the RRC state.

SS/PBCH Configuration Information

For example, the UE may report to the base station of the connection A time offset information desired and configured with the base station for receiving a SS/PBCH. Alternatively, the UE may report the desired time offset information for receiving SS/PBCH to the base station of the connection A. Alternatively, the UE may report timing information for when it is expected to receive the SS/PBCH, to the base station of the connection A, for example, the UE may receive the SS/PBCH in a portion of a subset(s) for receiving the SS/PBCH configured by the base station. The UE may determine the desired SS/PBCH configuration information to report to the base station of the connection A according to the SS/PBCH configuration information of the connection B.

Alternatively, the UE may report the SS/PBCH configuration information of the connection B to the base station of the connection A.

PDCCH Detection Information

The PDCCH detection information includes at least one of PDCCH search space configuration information, a number of carriers for PDCCH blind detection, a number of PDCCH blind detections, and a number of PDCCH channel estimations. For example, the UE may report to the base station of the connection A, the time offset information of the desired PDCCH search space and configured PDCCH search space by the base station. Alternatively, the UE may report the desired PDCCH search space timing information to the base station of the connection A. Alternatively, the UE may report timing information for when receiving the PDCCH is expected to be possible to the base station of the connection A. For example, the UE may receive the PDCCH in a portion of a subset(s) of the PDCCH search space configured by the base station. For another example, the UE reports the number Ncap of carriers for PDCCH blind detection to the base station of the connection A. When the UE maintains a RRC connected state with both the connection A and the connection B, the UE may report the number Ncap1 of carriers for PDCCH blind detection to the base station of the connection A, and the UE may report the number Ncap2 of carriers for PDCCH blind detection to the base station of the connection B. According to the number of connections the UE maintains, or according to the priorities of these connections, the UE may determine an appropriate number of carriers for PDCCH blind detection for each connection.

Alternatively, the UE may report the PDCCH detection information of the connection B, such as PDCCH search space configuration information, to the base station of the connection A.

Optionally, the PDCCH search space may be used to receive the PDCCH for scheduling system information.

Optionally, the PDCCH search space may be used to receive the PDCCH for a RAR.

Resource Configuration Information for Receiving Paging Messages

For example, the UE may report to the base station of the connection A an offset amount of resources for receiving paging messages configured by the base station. For example, the UE may report desired offset information to the base station of the connection A, so that the UE may receive paging information in paging frames (PFs) and/or paging occasions (POs) expected for receiving paging messages. The offset information may be an offset amount of UE_ID used to calculate the POs/PFs. For example, the PFs used for paging is determined according to (system frame number+paging frame offset) mod T=(T div N)*(UE_ID+offset information reported by the UE) mod N), where T is a DRX cycle of the UE, and N is a number of PFs in a DRX cycle. The indexes of the POs used for paging i_s=floor (UE_ID+offset information reported by the UE/N) mod Ns, where Ns is a number of POs in a PF.

For another example, the offset information is the PF time offset amount, and the PFs used for paging are determined according to (system frame number+paging frame offset+offset information reported by the UE) mod T=(T div N)*(UE_ID) mod N).

RACH Resource Configuration Information

For example, the UE may report to the base station of the connection A an offset amount of the RACH resources configured by the base station. Alternatively, the UE may report timing information for when transmitting a RACH is expected to be possible to the base station of the connection A. For example, the UE may transmit the RACH in a portion of a subset(s) of the RACH resources configured by the base station.

configuration information for HARQ-ACK feedback
  a minimum guaranteed transmit power when the UE communicates with the connection B
  a maximum transmitting power when the UE communicates with the connection B
  a number of supportable links A number of supportable links is a number of supportable carriers, and/or a number of supportable frequency bands, and/or a number of supportable antennas, and/or a number of supportable layers.

For example, the UE may report, to the base station of the connection A, a maximum number of carriers that may be used to communicate with the base station.

For example, the UE may report to the base station of the connection A the number of frequency bands available for communication with the base station. For example, the UE may support a maximum of 5 carriers, of which carriers 1 to 3 are carriers in a same frequency band X, and carriers 4 and 5 are carriers in a same frequency band Y. The UE reports that it may support 2 frequency bands. If the UE is only in the RRC connection state on the connection A, then the UE reports 2 frequency bands. If the UE is in the RRC connection state on both the connection A and the connection B, then the UE may report to the connection A that it may support 1 frequency band, and the UE may report to the connection B that it may support 1 frequency band.

For example, the UE may report to the base station of the connection A a number of receiving and/or transmitting links (Tx/Rx chains) that may be used to communicate with the base station. For example, the UE may support 2 transceiving links. If the UE is only in the RRC connection state on the connection A, then the UE reports 2 transceiving links. If the UE is in the RRC connection state on both the connection A and the connection B, then the UE reports to the connection A that it may support 1 transceiving link, and the UE reports to the connection B that it may support 1 transceiving link.

For example, the UE may report to the base station of the connection A a number of links used by connection B to communicate.

Supportable Transmit Power

For example, the UE may report to the base station of the connection A maximum transmit power that may be used for uplink communication with the base station. For another example, the UE may report to the base station of the connection A maximum transmit power used by the UE to communicate with the connection B, or the UE may report to the base station of the connection A minimum guaranteed transmit power used by the UE to communicate with the connection B. For example, when the UE establishes multiple connections with two base stations through two SIM cards, the UE determines maximum power available for uplink transmission with respective base stations according to information obtained from the two base stations, and informs each base station of the maximum power.

Supportable Beam Information

For example, the UE may report to the base station of the connection A, beam directions available for communication with the base station and/or a number of the available beam directions.

Priority Information

For example, the UE may report to the base station of the connection A, a priority of the base station during processing by the UE. For example, when the UE has only one uplink transmission channel, the UE may inform at least one of the base stations B that when two base stations schedule uplink transmission simultaneously, a priority of this base station B is lower than that of a base station A, so that the UE may not be able to perform uplink transmission to the base station B.

Information of being Unable to Respond to Scheduling by the Base Station

For example, the UE may report to the base station of the connection A a number or percentage of failures of transmitting according to the scheduling of the base station, or the timing pattern information of failures of transmitting according to the scheduling of the base station.

In-Device Interference Information

The UE may report to the base station of the connection A, information on frequency points that are interfered due to the in-device interference. For example, if the connection A and the connection B of the UE have carriers that are in the same frequency band(s), or carriers that are in different frequency bands but may interfere with each other, the UE may report information on the interfered carrier(s) to at least one of the connections. The information at least includes frequency information, information on the RAT that is interfered or causes interference, for example, NR, or LTE, and a direction of the interference, for example, whether it is interference caused by NR to LTE, or interference caused by LTE to NR, or interference caused by NR to NR, etc.

DRX Configuration

The UE may report, to the base station of the connection A, desired DRX configuration information, for example, DRX cycle and offset information (for example, drx-LongCycleStartOffset), DRX on-state timer (drx-onDurationTimer), etc.

Channel State Information (CSI) Processing Unit

The UE may report a number of supportable processing units that may process the CSI in parallel (CSI CPU) to the base station of the connection A. For another example, the UE reports to the base station of the connection A that the number of CSI CPUs is Ncsi. When the UE maintains the RRC connection state with both connection A and connection B, then the UE may report to the base station of the connection A the number of CSI CPUs as Ncsi1, and the UE may report to the base station of the connection B the number of CSI CPUs as Ncsi2.

Each connected base station may make corresponding scheduling decisions according to assist information reported by the UE. For example, if the UE reports the maximum uplink transmit power for the connection, then the base station of the connection cannot allocate uplink transmit power exceeding this value for the UE. For another example, if the UE reports timing information for when it is possible to transmit and receive on the connection, for example, symbols/time slots on which the UE may transmit and receive on this connection, then the base station cannot schedule the UE for downlink reception or uplink transmission on other symbols/slots. For another example, the base station may not comply with the information reported by the UE for scheduling. The base station expects that communication may be guaranteed on the available resources reported by the UE, but may not be performed on other resources. For another example, the base station may not comply with the information reported by the UE for scheduling, and the base station expects that the UE performs communication according to the scheduling and configuration of the base station.

The UE may inform the base station, through assist information, of whether the base station may change configuration related to the UE. For example, the UE notifies the base station of whether the base station may change the configuration related to the UE, by different assist information signaling, or by adding a modifiable type of the assist information to the assist information signaling.

Based on an example of the present invention, when a UE establishes connections with two different networks, called network 1 (for NPN) and network 2 (for PLMN), and the UE establishes connections with two different frequency points in the network 1, called frequency point 1 of the network 1 and frequency point 2 of the network 1. It is assumed that the UE may maintain at most M=2 connections simultaneously. According to the priority principle of the present invention, a priority of the NPN is higher than that of the PLMN, so that a priority of the network 1 is higher than that of the network 2. The UE may inform the network 2 that its priority is lower than that of the network 1. When the network 1 and the network 2 communicate with the UE simultaneously, the UE prefers selecting the network 1. For example, when both the two frequency points of the network 1 and the network 2 have demand for uplink transmission, the UE selects the two frequency points on the network 1 for uplink transmission.

Based on an example of the present invention, when a UE establishes connections with two different networks, called network 1 (for NPN) and network 2 (for PLMN), and the UE establishes connections with two different frequency points in the network 1, called frequency point 1 of the network 1 and frequency point 2 of the network 1. It is assumed that the UE may maintain at most M=2 connections simultaneously. According to the priority principle of the present invention, a priority of the NPN is higher than that of the PLMN, so that a priority of the network 1 is higher than that of the network 2. The UE may inform the network 2 that its priority is lower than that of the network 1. When the network 1 and the network 2 communicate with the UE simultaneously, the UE prefers selecting the network 1. For example, when both the two frequency points of the network 1 and the network 2 have demand for uplink transmission, the UE selects the two frequency points on the network 1 for uplink transmission. When both one frequency point of the network 1 and the network 2 have demand for uplink transmission, the UE selects the one frequency point of the network 1 as well as the network 2 for uplink transmission.

Based on an example of the present invention, when a UE establishes connections with two different networks, called network 1 (for NPN) and network 2 (for PLMN), and the UE establishes connections with two different frequency points in the network 2, called frequency point 1 of the network 2 and frequency point 2 of the network 2. It is assumed that the UE may maintain at most M=2 connections simultaneously. According to the priority principle of the present invention, a priority of the NPN is higher than that of the PLMN, so that a priority of the network 1 is higher than that of the network 2. The UE may inform the network 2 that its priority is lower than that of the network 1. When the network 1 and the network 2 communicate with the UE simultaneously, the UE prefers selecting the network 1. For example, when both the network 1 and the two frequency points of the network 2 have demand for uplink transmission, the UE selects the network 1 and one frequency point of the network 2 for uplink transmission. The base station may configure the UE to select semi-statically one connection between the two frequency points of the network 2 for uplink transmission, for example, the UE performs uplink transmission with the frequency point 1 only in the configured first set of uplink slots/symbols, and the UE performs uplink transmission with the frequency point 2 in other slots/symbols.

Based on an example of the present invention, when a UE establishes connections with two different networks, called network 1 (for LTE) and network 2 (for NR), and the UE establishes connections with two different frequency points in the network 2, called frequency point 1 of the network 2 and frequency point 2 of the network 2. It is assumed that the UE may maintain at most M=2 connections simultaneously. According to the priority principle of the present invention, a priority of the LTE is higher than that of the NR, so that a priority of the network 1 is higher than that of the network 2. The UE may inform the network 2 that its priority is lower than that of the network 1. When the network 1 and the network 2 communicate with the UE simultaneously, the UE prefers selecting the network 1. For example, when both the network 1 and the two frequency points of the network 2 have demand for uplink transmission, the UE selects the network 1 and one frequency point of the network 2 for uplink transmission. The base station may configure the UE to select dynamically one connection between the two frequency points of the network 2 for uplink transmission, for example, if the UE selects a connection where a signal with a higher priority is for transmission of the signal with the higher priority according to a type of an uplink signal to be transmitted.

Based on an example of the present invention, when the UE establishes connections with three networks, they correspond to MCG, SCG1, and SCG2 respectively. It is assumed that the UE may maintain a maximum of M=3 connections simultaneously, and it is necessary to ensure that the uplink transmit power does not exceed UE's maximum transmit power Pcmax. According to the priority principle of the present invention, a priority of the MCG is higher than a priority of the SCG1 and higher than a priority of the SCG2. The base station configures the SCG1 and the SCG2 as one connection group, and the MCG as one connection group. Power is allocated semi-statically between the two connection groups, and power is allocated dynamically within one connection group. The base station configures the maximum transmit power P1 and P2 for the two connection groups respectively. The UE needs to ensure that the maximum transmit power of respective connection group does not exceed the maximum transmit power of the group. Within one connection group, power may be dynamically allocated between the SCG1 and the SCG2 so that a sum of the transmit power of the two connections does not exceed P2. When the sum of the transmit power required by SCG1 and the transmit power required by SCG2 exceeds P2, according to the priority principle of the present invention, the transmit power of the SCG with a lower SCG number, that is, the transmit power of SCG1, is preferentially satisfied.

Based on an example of the present invention, when a UE establishes connections with two networks, called network 1 (SIM card 1) and network 2 (SIM card 2). It is assumed that the UE may maintain at most M=1 downlink connection simultaneously. According to the priority of the present invention, it is determined which connection to perform reception on according to different transmission procedures. When multiple connections have a same transmission procedure, other priority principles may be used, for example, it is determined which connection to perform reception on according to the priority of the SIM card 1 being higher than the priority of the SIM card 2. For example, it is assumed that the UE is in the RRC idle state in the network 1 and the UE is in the RRC connected state in the network 2, the UE switches to the network 1 at the corresponding time according to paging message configuration information of the network 1. If no paging message is received, then the UE switches back to the network 2. If a paging message is received in network 1 and an RRC connection needs to be established, then a RRC connection establishment procedure is completed in the network 1. If the UE maintains RRC connections in the network 1 and the network 2 simultaneously, then the UE maintains the connections in the two networks in turn by way of time division multiplexing. The pattern of the time division multiplexing may be determined by the network 1 and/or network 2 and notified to the UE, or determined by the UE and notified to the networks.

Those skilled in the art will understand that the various illustrative logical blocks, modules, circuits, and steps described in the present disclosure may be implemented as hardware, software, or a combination thereof. To clearly illustrate this interchangeability of hardware and software, various illustrative components, blocks, modules, circuits, and steps are generally described above in the form of their function sets. Whether such a function set is implemented as hardware or software depends on the specific disclosure and design constraints imposed on the overall system. Those skilled in the art can implement the described function sets in different ways for each specific disclosure, but such design decisions should not be interpreted as causing a departure from the scope of the present disclosure.

The various illustrative logic blocks, modules, and circuits described in the present disclosure can be implemented or performed by general-purpose processors, digital signal processors (DSPs), disclosure specific integrated circuits (ASICs), field programmable gate arrays (FPGAs) or other programmable logic devices, discrete gates or transistor logics, discrete hardware components, or any combination thereof designed to perform any combination of the functions described herein. A general-purpose processor may be a microprocessor, but in the alternative, the processor may be any conventional processor, controller, microcontroller, or state machine. The processor may also be implemented as a combination of computing devices, such as a combination of a DSP and a microprocessor, multiple microprocessors, one or more microprocessors that cooperate with a DSP core, or any other such configuration.

The steps of the method or algorithm described in the present disclosure may be directly embodied in hardware, in a software module executed by a processor, or in a combination thereof. The software module may reside in a RAM memory, flash memory, ROM memory, EPROM memory, EEPROM memory, register, hard disk, removable disk, or any other form of storage medium known in the art. An exemplary storage medium is coupled to the processor so that the processor can read and write information from/to the storage medium. In an alternative, the storage medium may be integrated into the processor. The processor and the storage medium may reside in ASIC. The ASIC may reside in the user. In an alternative, the processor and the storage medium may reside in a user as discrete components.

In one or more exemplary designs, the functions may be implemented in hardware, software, firmware, or any combination thereof. If implemented in software, each function may be stored on or transmitted by a computer-readable medium as one or more instructions or codes. Computer-readable medium includes both computer storage media and communication media, the latter including any medium that facilitates transfer of a computer program from one place to another. Storage media may be any available media that can be accessed by a general purpose or special purpose computer.

The embodiments of the present disclosure are merely for ease of description and assistance in comprehension of the present disclosure, and are not intended to limit the scope of the present disclosure. Therefore, it should be understood that, except for the embodiments disclosed herein, all modifications and changes or forms of modifications and changes derived from the technical concept of the present disclosure fall within the scope of the present disclosure.

The description above are merely exemplary embodiments of the present disclosure, and is not intended to limit the present disclosure. Any modification, equivalent replacement and improvement made within the spirit and principles of the present disclosure shall be encompassed in the protection scope of the present disclosure.

The invention claimed is:

1. A method performed by a user equipment (UE) in a communication system, the method comprising:
receiving configuration information from a base station;
determining a first number of connections scheduled based on the configuration information;
determining a second number of connections that the UE can establish simultaneously based on a first rule;
determining a priority of each respective connection based on a second rule; and
selecting the second number of connections from among the first number of connections based on the priority of each respective connection,
wherein the second rule is associated with at least one of a channel type, a carrier/cell type, a transmission procedure, a service type, or a carrier/cell frequency point, and
wherein, in case of determining the priority of each respective connection according to the channel type, priorities of a SS/PBCH and a PDCCH for a type-0 common search space (CSS) used for receiving system information are determined higher than priorities of other downlink channels.

2. The method of claim 1, wherein the connections are all uplink connections or all downlink connections.

3. The method of claim 1, wherein the first rule includes at least one of:
the second number not exceeding a number of radio frequency channels possessed by the UE,
the second number not exceeding a number of baseband processing branches that can be used for parallel processing possessed by the UE,
the second number not exceeding a number of beams that can be simultaneously used for transmission possessed by the UE,
the second number not exceeding a number of beams that can be simultaneously used for reception possessed by the UE,
a sum of transmit power expected for the second number of connections not exceeding a predefined maximum transmit power,
a number of directions of transmission beams expected for the second number of directions not exceeding a third number, or
a number of directions of reception beams expected for the second number of directions not exceeding the third number.

4. The method of claim 1,
wherein, in case of determining the priority of each respective connection according to the channel type, a priority of a type of an uplink channel is further determined according to at least one of the following priority rule:
a first priority to physical random access channel (PRACH) transmission on a primary cell (PCell),
a second priority to physical uplink control channel (PUCCH) transmission with hybrid automatic repeat request acknowledgement (HARQ-ACK) information and/or resource request (SR), or physical uplink sharing channel (PUSCH) transmission with HARQ-ACK information and/or SR,
a third priority to PUCCH transmission with channel state information (CSI) or PUSCH transmission with CSI,
a fourth priority to PUSCH transmission without HARQ-ACK information or CSI, and PUSCH transmission on a PCell of a type-2 random access procedure,
a fifth priority to sounding reference signal (SRS) transmission, or
wherein a priority of an aperiodic SRS is higher than that of a semi-permanent and/or periodic SRS, or PRACH transmission on a serving cell other than the PCell.

5. The method of claim 1, wherein, in case of determining the priority of each respective connection according to the channel type, a priority of a type of a downlink channel is further determined according to at least one of the following priority rule:
a priority of a synchronization signal (SS)/physical broadcast channel (PBCH) being higher than priorities of other downlink channels,
a priority of a SS/PBCH and/or a type-0 CSS being higher than a priority of a PDCCH for a type-1 CSS,
the priority of the PDCCH for the type-1 CSS being higher than a priority of a PDCCH for a type-2 CSS,
the priority of the PDCCH for the type-2 CSS being higher than a priority of a PDCCH for a user specific search space (USS), or
a priority of a PDCCH being higher than a priority of a PDSCH.

6. The method of claim 1, wherein, in case of determining the priority of each respective connection according to the carrier/cell type, a priority of a carrier/cell is determined according to at least one of the following priority rule:
a priority of a primary cell (Pcell) being higher than a priority of a secondary cell (Scell),
a priority of a carrier/cell in a primary cell group (MCG) being higher than a priority of a carrier/cell in a secondary cell group (SCG),
a priority of a carrier/cell that carries a physical uplink control channel (PUCCH) being higher than a priority of a carrier/cell that does not carry the PUCCH,
a priority of a non-supplementary carrier being higher than a priority of a supplementary carrier,
a priority of a carrier/cell of a non-public network (NPN) being higher than a priority of a carrier/cell of a public land mobile network (PLMN), the priority of the carrier/cell of the PLMN being higher than the priority of the carrier/cell of the NPN, a priority of a carrier/cell of an independent non-public network being higher than a priority of a carrier/cell of a NPN based on a PLMN network, the priority of the carrier/cell of the NPN based on the PLMN network being higher than the priority of the carrier/cell of the independent non-public network, or a priority order of a serving cell of a respective SIM card being determined based on UE settings.

7. The method of claim 1, wherein, in case of determining the priority of each respective connection according to the transmission procedure, a priority of a connection is determined according to at least one of the following priority rule:
   a first priority to an initial access procedure,
   a second priority to a random access procedure or a RRC connection establishment procedure,
   a third priority to a procedure of receiving paging messages, or
   a fourth priority to other procedures.

8. The method of claim 1, wherein, in case of determining the priority of each respective connection according to the service type, a priority of a connection is determined according to at least one of the following methods:
   determining the priority according to priority information of a configured physical channel or signal; or
   determining the priority according to priority information of a service.

9. The method of claim 1, wherein, in case of determining the priority of each respective connection according to the carrier/cell frequency point, a priority of a connection is determined according to a principle that a priority of a carrier/cell of a low frequency band of a connection is higher than a priority of a carrier/cell of a high frequency band of a connection.

10. The method of claim 1, further comprising:
   reporting interaction capability of each connection to the base station; and
   selecting a connection based on configuration information including a connection selection method from the base station,
   wherein, in case that the UE has multiple connections, the UE divides the multiple connections into one or more connection groups based on the configuration information from the base station, each connection group including one or more connections, and
   wherein, the UE selects a connection in a respective connection group based on the configuration information from the base station, and allocates power to the connection.

11. The method of claim 10,
   wherein the interaction capability is reported per frequency point, RAT, or SIM card, and
   wherein the connection selection method is configured per frequency, RAT, SIM card, or connection group.

12. The method of claim 1, further comprising:
   transmitting assist information to the base station side;
   receiving scheduling information configured with reference to the assist information, from the base station; and
   performing communication based on the scheduling information of the base station.

13. The method of claim 12, wherein the assist information include at least one of timing information of reception/transmission, resource occupancy information, RRC state, SS/PBCH configuration information, PDCCH detection information, resource configuration information used for receiving paging messages, RACH resource configuration information, configuration information for HARQ-ACK feedback, a minimum guaranteed transmit power when the UE connects with B, a maximum transmit power when the UE connects with B, a number of supportable links, supportable transmit power, supportable beam information, priority information, information that scheduling of the base station cannot be responded, in-device interference information, DRX configuration, or a channel state information (CSI) processing unit.

14. A user equipment (UE) in a communication system, the UE comprising:
   a transceiver; and
   a controller configured to:
      receive, from a base station via the transceiver, configuration information,
      determine a first number of connections scheduled based on the configuration information,
      determine a second number of connection that the UE can establish simultaneously based on a first rule,
      determine a priority of each respective connection based on a second rule, and
      select the second number of connections from the first number of connections based on the priority of each respective connection,
   wherein the second rule is associated with at least one of a channel type, a carrier/cell type, a transmission procedure, a service type, or a carrier/cell frequency point, and
   wherein, in case of determining the priority of each respective connection according to the channel type, priorities of a SS/PBCH and a PDCCH for a type-0 common search space (CSS) used for receiving system information are determined higher than priorities of other downlink channels.

* * * * *